United States Patent [19]

Stuart et al.

[11] Patent Number: 4,910,334

[45] Date of Patent: * Mar. 20, 1990

[54] RECOVERY OF OVERBASED ALKALINE EARTH METAL ADDITIVES FROM CENTRIFUGATES

[75] Inventors: Frank A. Stuart, San Rafael; William H. Tyson, Jr., Moraga, both of Calif.

[73] Assignee: Claypro Corporation, Point Richmond, Calif.

[*] Notice: The portion of the term of this patent subsequent to Jun. 19, 2001 has been disclaimed.

[21] Appl. No.: 682,667

[22] Filed: Dec. 17, 1984

Related U.S. Application Data

[63] Continuation-in-part of Ser. No. 526,011, Aug. 24, 1983, Pat. No. 4,554,491.

[51] Int. Cl.$^4$ .................. C07C 143/24; C07C 65/04; C07C 61/00
[52] U.S. Cl. .................................. 562/96; 562/475; 562/511; 568/756
[58] Field of Search .................. 210/768; 260/504 A; 562/96, 475, 511; 568/756

[56] References Cited

U.S. PATENT DOCUMENTS

| | | | |
|---|---|---|---|
| 2,884,445 | 4/1959 | Axe et al. | 260/504 A |
| 3,725,467 | 4/1973 | Chorney | 260/504 A |
| 4,129,589 | 12/1978 | Eliades et al. | 260/504 A |
| 4,614,597 | 9/1986 | Stuart et al. | 260/504 A |

*Primary Examiner*—Alan Siegel
*Attorney, Agent, or Firm*—Limbach, Limbach & Sutton

[57] ABSTRACT

Centrifugates obtained by centrifuging the reaction product of a process in which organic acids selected from the group consisting of higher alkyl benzene sulfonic acids, higher alkyl naphthenic acids, higher alkyl salicylic acids and higher alkyl phenols or alkali metal salts of the acids are contacted with a base acting alkaline earth metal compound to produce an alkaline earth metal salt of the selected acid are mixed with a quantity of an aqueous solution of an acid having an ionization constant greater than $1 \times 10^{-5}$ sufficient to bring the pH of the centrifugate-acid mixture to a level in the range about 2 to 10 and settling the mixture to separate a lower aqueous phase and an upper liquid product phase and recovering the upper phase.

7 Claims, No Drawings

RECOVERY OF OVERBASED ALKALINE EARTH METAL ADDITIVES FROM CENTRIFUGATES

This application is a continuation-in-part of Ser. No. 526,011 now U.S. Pat. No. 4,544,491, filed Aug. 24, 1983.

TECHNICAL FIELD

This invention lies in the field of neutral and overbased alkaline earth metal salts of organic acids used as lubricating oil additives. More specifically, the invention relates to improving the yield of these alkaline earth salts of organic acids which are produced by conventional manufacturing methods

BACKGROUND OF THE INVENTION

Processes for the manufacture of additives are briefly described in the Kirk Othmer Encyclopedia of Chemical Technology, Third Edition, Vol. 22, at page 23, and the description is abundantly referenced. The manufacture of these additives is described in greater detail in Chemical Technology Review, No. 2, 1973, "Lubricant Additives" at Pages 67 through 83, Ranney, Noyes Data Corporation. Manufacturing methods are further described in U.S. Pat. Nos. 2,629,109, 3,861,507 and 4,129,589.

While the various methods of manufacture differ in specifics, they all appear to include mixing a precursor organic acid, such as the higher alkyl benzene sulfonic acid, the higher alkyl naphthenic acid, a higher alkyl salicylic acid or a higher sulfurized alkyl phenol or the alkali metal salt of a selected one of these with a quantity of a base-acting compound of an alkaline earth metal, such as magnesium, calcium, or barium, greatly in excess of the amounts stoichiometrically required to neutralize the acid or metathesize the alkali metal salt. An organic solvent, usually a hydrocarbon, is employed as the reaction medium and an alcohol is commonly added as a promoter. When the process is directed to the production of overbased salts a large stochiometric excess of alkaline earth metal compound is used and carbon dioxide is blown through the total mixture. The reaction product is a slurry of unreacted base acting alkaline earth metal compound in the overbased alkaline earth metal salt product which is dissolved in the reaction medium. This slurry is commonly centrifuged to separate the alkaline earth metal salt product in solution in the reaction medium oil and a centrifugate, which is a thin slurry containing solid unreacted alkaline earth material dispersed in the product and reaction medium.

The centrifugates are opaque liquids having a viscosity comparable to that of the reaction medium and contain large quantities of suspended finely divided hydroxides and carbonates of the alkaline earth metal.

BRIEF DESCRIPTION OF THE INVENTION

Pursuant to the invention, the centrifugates above described are mixed with an aqueous solution of an acid having an ionization constant in excess of $1 \times 10^{-5}$, the acid concentration being in excess of 0.5 normal and the quantity of acid added to the centrifugate being sufficient to bring the pH of the resulting mixture to a level in the range about 2 to 10. The mixture is then settled to separate a lower slurry phase and an upper liquid product phase consisting of the alkaline earth metal salt additive in solution in the reaction medium.

A number of variables affect the completeness of the recovery of the additive product from the centrifugate, these being the particular acids used to treat the centrifugate, the concentration and volume of acid added to the centrifugate, the pH of the final acid/centrifugate mixture, the temperature at which the mixture is maintained to effect separation and, in some cases, the addition of an organic hydrocarbon to decrease the viscosity of the acid/centrifugate mixture to facilitate separation.

DETAILED DESCRIPTION

The process of the invention is described in detail in the following examples:

EXAMPLE 1

Five hundred grams of a centrifugate obtained during manufacture of an overbased magnesium sulfonate were weighed into a two liter beaker at room temperature. The centrifugate was a thin slurry of magnesium oxide, hydroxide and carbonate in a solution of overbased magnesium sulfonate in a hydrocarbon oil which constituted the reaction medium.

Sixteen hundred cc's of 5N sulfuric acid, at room temperature, were added to the centrifugate from a dropping funnel over a period of approximately half an hour. The acid was added slowly because heavy foaming due to the release of carbon dioxide occurs, particularly in the latter part of the reaction. The rate of addition is controlled to avoid excessive foaming. Vigorous manual stirring of the mixture was maintained with a stirring rod during the addition. The temperature rose from heat of neutralization to 180°–190° F.

Initially, the acid is absorbed into the centrifugate but as the reaction proceeds, two phases begin to form. These are mixed, however, with agitation until the total volume of acid has been added. At this point, the pH of the aqueous phase was approximately 2 and the mixture was allowed to separate, yielding a yellowish aqueous phase and a clear dark upper oil layer. The aqueous phase was a solution of magnesium sulfate and the upper phase was a solution of magnesium sulfonate in the hydrocarbon oil.

In large scale operation it is appropriate to return a substantial portion of the centrifugate to the reaction zone in which the sulfonic acid is reacted with the basic magnesium compounds to provide a portion of the basic magnesium compound reactant.

EXAMPLE 2

One hundred grams of a solid containing centrifuge stream obtained by centrifuging a calcium alkyl salicylate was heated to 160° F. and 220 cubic centimeters of 4 normal sulfuric acid was added to the centrifuge stream with vigorous agitation. Vigorous foaming occurred and a white precipitate formed, which, by the end of the run appeared to be relatively free of trapped oil. The mixture contained no free aqueous phase and after standing for 5 minutes at 180° to 200° F., an oil phase separated and was decanted from a pasty mixture of calcium sulfate and water. The volume of the separated oil was 65 ccs. The slurry underlying the separated oil phase was diluted with 200 ccs of hot water and then separated into three phases, a white calcium sulfate phase at the bottom, an intermediate phase of clear aqueous acid and about 5 cubic centimeters of oil overlaying the aqueous phase.

In cases where the centrifugate is heavily laden with basic calcium compounds, these compounds are converted to calcium sulfate and a rather thick slurry is formed, addition of hot water to the slurry as shown above or addition of more sulfuric acid, thins the slurry and incremental oil is freed.

EXAMPLE 3

A solids containing centrifuge stream obtained by centrifuging an overbased magnesium sulfonate additive in oil was treated with sulfuric acid. The centrifuge stream had a solids content of about 25% and the solids consisted of magnesium oxide, magnesium carbonate and magnesium hydroxide. 100 grams of the centrifuge stream were heated to 200° F. and 40 grams of toluene were added. Eight normal sulfuric acid was added to the resulting mixture and by the time that 85 ccs. had been added oil began to separate out. Acid addition was continued until 100 cubic centimeters had been added. The pH after this addition was 7.8 and about 66 grams of oil separated from the centrifuge product and was decanted. 31 cubic centimeters of 8 normal sulfuric acid were then added bringing the pH to 7.3 and a few additional cubic centimeters of oil separated and were decanted. 22 cubic centimeters of 10 normal sulfuric acid were then added, bringing the pH to 2.6 but only a trace of additional oil separated. Oil separation in this example, in which toluene was added, was superior to results earlier obtained with this centrifuge stream when no toluene was added.

When the sulfuric acid used has a high concentration, e.g., 6N to 10N, the quantity of sulfuric acid required is a relatively small volume. The thickness of the centrifugate-acid mixture is then greater and the low fluidity of the sulfuric acid-centrifugate mixture impedes the release of oil containing magnesium sulfonate from the solids. Addition of about 20 to 80 cc of a hydrocarbon diluent to the acid-centrifugate mixture increases the fluidity of the mixture and facilitates release of the oil-magnesium sulfonate from the solids. Suitable hydrocarbon diluents are toluene, xylenes and petroleum distillates boiling in about the 200°–300° F. range.

EXAMPLE 4

One hundred grams of centrifugate from overbased calcium sulfonate production was weighed into a 500 cc beaker. 300 cc's of 5N sulfuric acid was added over a period of about 5 minutes with continued stirring. Both reactants were at room temperature initially but the temperature rose to 150°–155° F. from heat of neutralization. At this point the mixture was held at 160° F. and two phases developed—a white dispersion of calcium sulfate in water which acted as one phase and a clear oil floating above the slurry and suspended through it. 40 cc's of this oil was decanted from the mixture.

EXAMPLE 5

Three hundred cc's of 5N hydrochloric acid was added slowly in increments with continuing stirring to 100 grams of magnesium centrifugate over a period of 10 minutes. The reaction started at room temperature but the heat of neutralization raised it to 180° F. The mixture at this point had a pH of 2 and separated into two phases—an upper emulsion phase and a lower phase of clear yellow-green solution. After standing overnight, the emulsion separated somewhat and gave a mixture of clear oil above water with a cuff between.

EXAMPLE 6

Example 5 was repeated using 5N nitric acid. Results were comparable to those of Example 5 yielding 150 cc's of an emulsion, 13 grams of magnesium sulfate were added and the mixture heated for 15 minutes and then allowed to stand. After 20 minutes, the emulsion separated into 50 cc's of oil and 250 cc's of a magnesium nitrate-magnesium sulfate solution.

When hydrochloric acid (Example 5) or nitric acid (Example 6) are used sulfuric acid, an appreciable emulsion-forming tendency is noted in the upper phase. It is found that addition of magnesium sulfate in solid or concentrated solution form while maintaining temperature above 150° F. breaks the emulsion releasing an oil phase.

EXAMPLE 7

To 100 grams of centrifugate of Example 6 500 cc's of 5N acetic acid followed by 212 cc's of glacial acetic acid were added. During the early reaction, a brittle solid was formed but as more acetic acid was added, it dissolved.

After the addition of the glacial acetic acid, the pH remained at 6 and the mixture separated into a clear dark oil above a brown aqueous solution.

While a weak acid, such as acetic, can bring about separation of the centrifugates the volume and concentration of acid required are high and the stronger acids are much preferred.

EXAMPLE 8

One hundred grams of centrifugate from production of an alkyl salicylic alkaline earth salt were mixed with 200 cc's of 5N sulfuric acid at room temperature. This brought the mixture to a pH of 2 and a good separation resulted, giving a clear oil and a white suspension of calcium sulfate in water. $CO_2$ continued to bubble slowly from the lower layer for about an hour, following which the clear oil was decanted.

EXAMPLE 9

Two hundred grams of the same centrifugate used in Example 8 was mixed with 250 cc's of 4N sulfuric acid at 160° F. The acid was added over a period of 20–30 minutes with continuous stirring. $CO_2$ was evolved and an excellent separation obtained, giving a clear dark oil of 80 cc's volume above a water phase of about the same volume and a bright white layer of calcium sulfate.

EXAMPLE 10

One hundred grams of the centrifugate of Example 8 was heated to 190° F. and 100 cc's of 5N sulfuric acid at the same temperature was added. The mixture was stirred during addition and $CO_2$ was evolved. This brought the pH of the aqueous phase down to a value of 9.6. Stirring was discontinued and the mixture separated into two phases—dark oil above a solid slurry of calcium sulfate in water. The oil was decanted. An additional 20 cc's of 5N sulfuric acid was added, using the same procedure, bringing the pH down to 7.6. A small volume of oil was decanted at this point. There still appeared to be oil in the solid slurry, so an additional 40 cc's of 5N sulfuric acid was added, bringing the pH down to 2.3 and liberating more free oil. This was also decanted.

Calcium contents of the three oils decanted above were determined and found to be 1.7, 1.0 and zero, indicating that at higher pH's the calcium salt of the alkyl salicylic acid is being liberated.

The results obtained in this example show that if it is desired to recover alkaline earth metal salt as such sufficient acid to bring the pH of the acid-centrifugate mixture into the 7–10 range is added and the upper phase separated will be a solution of alkaline earth metal salt in oil. When the acid added takes pH of the mixture to the 2–3 range the upper phase will be a solution mainly of the organic acid in oil.

EXAMPLE 11

158 grams of a centrifugate obtained by centrifuging the reaction product obtained from the reaction of a higher alkyl naphthenic acid with calcium hydroxide and carbon dioxide were mixed with 250 cc of 4N sulfuric acid added over a 10-minute period at room temperature. After addition of 50 cc of the sulfuric acid the temperature rose to 110° F. Addition of the remainder of the sulfuric acid brought the temperature to 120° F. During the acid addition carbon dioxide was released. The mixture was then settled forming a clear dark oil phase overlaying an acid phase containing dispersed white calcium sulfate. 125 cc of oil was recovered.

It should be noted that pH of the acid-centrifugate mixture can be used as a control of the quantity (conc. x volume) of acid added.

The quantity of acid added may also be properly controlled by titrating a sample of the centrifugate with the acid to be employed and determining the quantity of acid, expressed in equivalents of acid per 100 grams of centrifugate required to reach the desired pH.

In the above examples the total number of equivalents of acid per each 100 grams of centrifugate were: Example 1—1.6 Eq., Example 2—0.88 Eq., Example 3—1.25 Eq., Example 4—1.5 Eq., Example 5—1.75 Eq., Example 6—1.75 Eq., Example 7—5.5 Eq., Example 8—1.0 Eq., Example 9—0.5 Eq. and Example 10—0.8 Eq.

For commercially produced centrifugates it appears that when a strong acid is employed, e.g., sulfuric acid, from 0.5 to 1.5 equivalents of acid per 100 grams of centrifugate are appropriate amounts. The acid concentration preferably should be at least 0.5N to avoid handling large volumes of acid-centrifugate mixtures.

In addition to the overbased sulfonates, naphthenates and salycilates shown in the examples overbased alkyl phenates or sulfurized phenates yield centrifugates which when treated by the present process are similarly separated into a recoverable organic upper phase and a lower acid-calcium sulfate slurry.

We claim:

1. The method of increasing the product yield of a process in which an organic acid selected from the group consisting of higher alkyl sulfonic acids, higher alkyl naphthenic acids, higher alkyl salicylic acids and higher alkyl phenols or an alkali metal salt of the acid is contacted with a stoichimometric excess of a base acting calcium compound in the presence of a hydrocarbon diluent in a reaction zone to produce an calcium salt of the selected acid which comprises:
   (a) centrifuging the reaction product to separate liquid produce and a centrifugate comprising a slurry of unreacted base acting calcium compound in liquid product;
   (b) mixing the centrifugate with a quantity of aqueous solution of sulfuric acid sufficient to bring the pH of the mixture to a level in the range about 2 to 10, the concentration of the sulfuric acid solution being in excess of 0.5N, and;
   (c) settling the mixture to separate a lower slurry phase and an upper liquid product phase and recovering the upper phase.

2. The method defined in claim 1 wherein a substantial portion of the centrifugate obtained in step (a) is returned to the reaction zone and the remainder is sent to steps (b) and (c).

3. THe method of increasing the product yield of a process in which an organic acid or an alkali metal salt of said acid selected from the group consisting of higher alkyl phenols, higher alkyl naphthenic acids, higher alkyl sulfonic acids and higher alkyl salicylic acids is contacted with a stoichiometric excess of a calcium compound selected from the group consisting of calcium oxide, calcium hydroxide and calcium carbonate in the presence of a hydrocarbon diluent and carbon dioxide gas in a reaction zone to produce an overbased calcium salt of the selected organic acid which comprises;
   (a) centrifuging the reaction product to separate a liquid product and a centrifugate comprising a slurry of unreacted calcium compound in liquid product;
   (b) mixing the centrifugate with aqueous sulfuric acid in amount sufficient to bring the pH of the resulting mixture to a level in the range 2 to 10;
   (c) settling the mixture to separate an upper liquid product phase and a lower aqueous slurry phase and recovering the upper phase.

4. The method defined in claim 3 wherein the concentration of sulfuric acid in step (b) is at least 4N.

5. The method defined in claim 3 wherein the mixture obtained in step (b) is at a temperature above about 150° F.

6. The method defined in claim 3 wherein the concentration of the sulfuric acid is in the range 4N to 10N and adding to the mixture prior to settling 20 to 80 cc of a hydrocarbon diluent for each 100 g of centrifugate contained in the mixture prior to settling.

7. The method of increasing the product yield of a process in which an organic acid or an alkali metal salt of said acid selected from the group consisting of higher alkyl phenols, higher alkyl naphthenic acids, higher alkyl sulfonic acids and higher alkyl salicylic acids is contacted with a stoichiometric excess of an calcium compound selected from the group consisting of calcium oxide, calcium hydroxide and calcium carbonate in the presence of a hydrocarbon diluent and carbon dioxide in a reaction zone to produce an overbased calcium salt of the selected organic acid which comprises;
   (a) centrifuging the reaction product to separate a liquid product and a centrifugate comprising a slurry of unreacted calcium compound in liquid product;
   (b) mixing the centrifugate with a quantity of 4N to 6N sulfuric acid to form a mixture containing from 0.5 to about 1.5 equivalents of sulfuric acid for each 100 grams of centrifugate;
   (c) maintaining the mixture in step (b) at a temperature in the range 150° F. to the boiling point of the mixture, and;
   (d) settling the mixture to separate an upper liquid product phase and a lower slurry phase and recovering the upper phase.

* * * * *